F. C. ELLIOT.
PLANT PROTECTOR.
APPLICATION FILED FEB. 20, 1908.
905,674.
Patented Dec. 1, 1908.
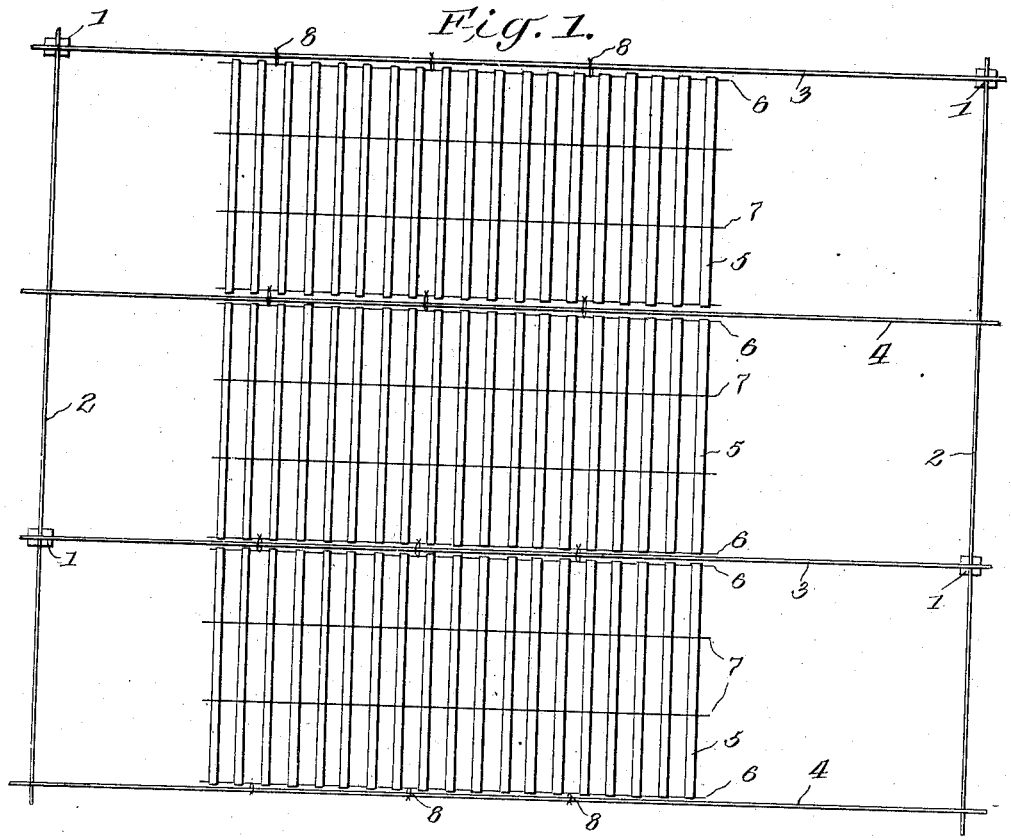
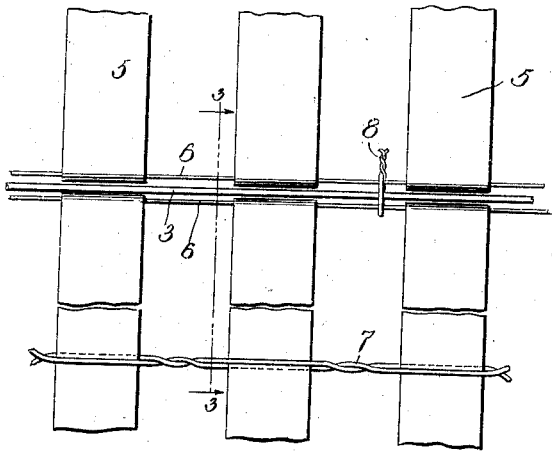
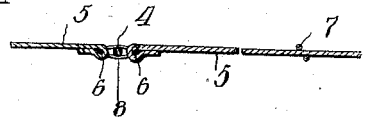
Witnesses
Inventor
FRED C. ELLIOT.
By Attorney

UNITED STATES PATENT OFFICE.

FRED COTTEN ELLIOT, OF TALLAHASSEE, FLORIDA.

PLANT-PROTECTOR.

No. 905,674.  Specification of Letters Patent.  Patented Dec. 1, 1908.

Application filed February 20, 1908. Serial No. 416,830.

*To all whom it may concern:*

Be it known that I, FRED C. ELLIOT, a citizen of the United States, and a resident of Tallahassee, in the county of Leon and State of Florida, have invented certain new and useful Improvements in Plant-Protectors, of which the following is full, clear, and exact description.

The object of the invention is to provide a partial shade for growing plants, such as tobacco, pineapples, etc., the protector being so arranged that the plants are subjected to alternate bars of sunlight and shadow, the bars extending north and south, so that during the apparent motion of the sun from east to west the bars of sunshine and shadow will travel from west to east, thus subjecting each part of the plant to alternate bars of sunshine and shadow.

Referring to the drawings forming a part hereof Figure 1 is a plan view of a portion of the improved protector in use. Fig. 2 is an enlarged detail of a portion of the same, and Fig. 3 is a section on the line 3—3 of Fig. 2.

In the practical application of the invention, the posts 1 are arranged in spaced parallel rows and the corresponding posts of the rows are connected by wires 2 and 3, the wires 2 running in one direction, and the wires 3 running in the other direction and crossing the wires 2. The wires may be of iron or steel of suitable size and length, and are all substantially in the same horizontal plane and elevated a suitable distance above the ground. The wires and posts are so arranged that one series 3 of wires run east and west and the other 2 north and south. Between each pair of east and west wires is arranged an intermediate wire 4, in the present construction, the ends of the intermediate wire being connected with the outside north and south wires 2.

The improvement comprises a screen composed of lengths of a fabric comprising thin sheet metal strips or slats 5, having their ends connected with wires of suitable gage 6, in any suitable manner, in the present instance by bending the ends of the strips over the wires. A plurality of intermediate bracing wires 7 are also made use of to properly retain the slats in their spaced position and to prevent the centers thereof from sagging when the protector is in place.

The protector is manufactured in suitable lengths and afterwards galvanized in order to protect it from deterioration and also to solder or unite the parts.

The slats or strips are spaced apart from each other a suitable distance depending upon the width of the slats, and also upon the purpose for which they are to be used.

The posts are preferably from 8 to 10 feet high, and are placed about 30 feet apart from east to west, and about 12 feet apart from north to south. The north and south wires are usually of about No. 8 gage, and the east and west wires about No. 4 gage.

The lengths of the protector are arranged east and west, and the side wires of the lengths are connected with the east and west wires 3, by any suitable fastening devices, in the present instance by loops of wires 8, the loop being passed around the side wires of the lengths, and the east and west wires, and the ends twisted to retain the loop in place.

The protector is easily placed, does not readily deteriorate, is indestructible by fire and does not warp from the heat of the sun.

I claim:

1. A device for protecting growing plants, comprising a plurality of spaced posts, a series of parallel wires connected with the posts, a transverse series of parallel wires connected with the posts and with the first wires, and a screen supported by the wires, said screen comprising parallel side wires, thin sheet metal strips or slats spaced apart from each other and having their ends connected with the side wires, intermediate bracing wires connected with the strips or slats, and loops connecting the side wires with the wires of the transverse series.

2. A device of the class described, comprising spaced side wires and thin sheet metal strips arranged in spaced relation and having their ends bent over the side wires whereby to connect said side wires, the strips being galvanized after being connected.

FRED COTTEN ELLIOT.

Witnesses:
 V. J. RANDOLPH,
 O. M. JACOBIE.